US009690593B2

(12) United States Patent
Edwards et al.

(10) Patent No.: US 9,690,593 B2
(45) Date of Patent: Jun. 27, 2017

(54) SERVER INFORMATION HANDLING SYSTEM CONFIGURATION FROM AN END STATE DEFINITION FILE

(71) Applicant: Dell Products L.P., Round Rock, TX (US)

(72) Inventors: William C. Edwards, Round Rock, TX (US); Jon Robert Hass, Austin, TX (US); Pushkala Iyer, Round Rock, TX (US); Satyajit Dipakbhai Desai, Austin, TX (US); Selvaraju Subbiah, Austin, TX (US); Vance Edward Corn, Austin, TX (US); Cyril Jose, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 875 days.

(21) Appl. No.: 13/783,605

(22) Filed: Mar. 4, 2013

(65) Prior Publication Data

US 2014/0250292 A1 Sep. 4, 2014

(51) Int. Cl.
*G06F 9/44* (2006.01)
*G06F 9/445* (2006.01)
*G06F 1/32* (2006.01)

(52) U.S. Cl.
CPC .............. *G06F 9/4401* (2013.01); *G06F 9/44* (2013.01); *G06F 9/44505* (2013.01); *G06F 1/32* (2013.01)

(58) Field of Classification Search
CPC ..... G06F 1/32; G06F 1/26; G06F 1/28; G06F 1/00
USPC ... 713/2, 300, 310, 320, 321, 322, 323, 324, 713/330, 340, 345, 375
See application file for complete search history.

(56) References Cited

U.S. PATENT DOCUMENTS

| | | | | |
|---|---|---|---|---|
| 6,308,099 B1 * | 10/2001 | Fox | ..................... | A61N 1/37252 607/30 |
| 6,604,238 B1 * | 8/2003 | Lim | ......................... | G06F 8/61 705/26.41 |
| 7,366,985 B1 * | 4/2008 | McKeeth | .............. | G06F 9/4446 715/705 |
| 8,122,111 B2 * | 2/2012 | Shekar Cs et al. | ........... | 709/221 |
| 8,725,844 B2 * | 5/2014 | Goin | .................. | H04L 41/0803 709/220 |
| 2009/0222531 A1 * | 9/2009 | London | ................ | H04L 67/025 709/217 |
| 2010/0057680 A1 * | 3/2010 | Little | ............................... | 707/3 |
| 2012/0102480 A1 * | 4/2012 | Hopmann | ................ | G06F 8/67 717/172 |
| 2012/0198221 A1 * | 8/2012 | Tukol et al. | ..................... | 713/2 |
| 2012/0278455 A1 * | 11/2012 | Peng et al. | ..................... | 709/220 |
| 2012/0324161 A1 * | 12/2012 | Cao | ....................... | G06F 11/167 711/114 |
| 2013/0125107 A1 * | 5/2013 | Bandakka | .............. | G06F 8/665 717/171 |
| 2013/0139139 A1 * | 5/2013 | Mallur | ...................... | G06F 8/65 717/170 |
| 2014/0122862 A1 * | 5/2014 | Ludwig | .................... | G06F 8/65 713/100 |

* cited by examiner

*Primary Examiner* — Keshab Pandey
(74) *Attorney, Agent, or Firm* — Terrile, Cannatti, Chambers & Holland, LLP; Robert W. Holland

(57) ABSTRACT

One step server information handling system configuration reduces complexities associated with remote server maintenance through a management network. A configuration end state sent through the management network, such as an XML file, is parsed by a management processor to automatically initiate and complete configuration of the server to the end state without further commands through the management network.

26 Claims, 4 Drawing Sheets

End State Definition XML Schema file (XSD)
```
<?xml version="1.0" ?>
<xs:schema attributeFormDefault="unqualified" elementFormDefault="qualified" xmlns:xs="
HYPERLINK http://www.w3.org/2001/XMLSchema http://www.w3.org/2001/XMLSchema">
    <xs:element name="SystemConfiguration">
        <xs:complexType>
            <xs:sequence>
                <xs:element maxOccurs="unbounded" name="Component">
                    <xs:complexType>
                        <xs:sequence>
                            <xs:choice maxOccurs="unbounded">
                                <xs:element minOccurs="0" maxOccurs="unbounded" name="Attribute">
                                    <xs:complexType>
                                        <xs:simpleContent>
                                            <xs:extension base="xs:string">
                                                <xs:attribute name="Name" type="xs:string" use="required" />
                                            </xs:extension>
                                        </xs:simpleContent>
                                    </xs:complexType>
                                </xs:element>
                                <xs:element minOccurs="0" maxOccurs="unbounded" name="Component">
                                    <xs:complexType>
                                        <xs:sequence>
                                            <xs:element minOccurs="0" maxOccurs="unbounded" name="Component">
                                                <xs:complexType>
                                                    <xs:sequence>
                                                        <xs:element minOccurs="0" maxOccurs="unbounded" name="Attribute">
                                                            <xs:complexType>
                                                                <xs:simpleContent>
                                                                    <xs:extension base="xs:string">
                                                                        <xs:attribute name="Name" type="xs:string" use="required" />
                                                                    </xs:extension>
                                                                </xs:simpleContent>
                                                            </xs:complexType>
                                                        </xs:element>
                                                    </xs:sequence>
                                                    <xs:attribute name="FQDD" type="xs:string" use="required" />
                                                </xs:complexType>
                                            </xs:element>
                                            <xs:element minOccurs="0" maxOccurs="unbounded" name="Attribute">
                                                <xs:complexType>
                                                    <xs:simpleContent>
                                                        <xs:extension base="xs:string">
                                                            <xs:attribute name="Name" type="xs:string" use="required" />
                                                        </xs:extension>
                                                    </xs:simpleContent>
                                                </xs:complexType>
                                            </xs:element>
                                        </xs:sequence>
                                        <xs:attribute name="FQDD" type="xs:string" use="required" />
                                    </xs:complexType>
                                </xs:element>
                            </xs:choice>
                        </xs:sequence>
                        <xs:attribute name="FQDD" type="xs:string" use="required" />
                    </xs:complexType>
                </xs:element>
            </xs:sequence>
            <xs:attribute name="Model" type="xs:string" use="required" />
            <xs:attribute name="ServiceTag" type="xs:string" use="required" />
            <xs:attribute name="TimeStamp" type="xs:string" use="required" />
        </xs:complexType>
    </xs:element>
</xs:schema>
```

*Figure 4*

SERVER INFORMATION HANDLING SYSTEM CONFIGURATION FROM AN END STATE DEFINITION FILE

BACKGROUND OF THE INVENTION

Field of the Invention

The present invention relates in general to the field of information handling system management, and more particularly to server information handling system configuration from an end state definition file.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are often deployed by an enterprise at multiple physical locations to improve reliability by limiting the impact of infrastructure failures at any one physical location. For example, power outages or cut communication cables at one data center location will not prevent other data center locations from supporting network operations. One difficulty with the use of diverse physical locations is that information technology specialists are generally required at each location to maintain the systems. In order to reduce maintenance costs and to coordinate management of deployed server information handling systems, out-of-band communication is typically supported by management subsystems at the deployed server information handling systems. For example, a baseboard management controller (BMC) at each server information handling system provides hooks that allow control of server information handling system components, such as a remote power-up or power-down of an information handling system. Typically, a BMC interfaces with a management network that is configured separately from other network interfaces of the server information handling system. By having such an out-of-band management network, access to physical control of the server information handling system is generally maintained with better security.

One difficulty with remote management of server information handling systems is that management activities through an out-of-band network interface tend to be non-intuitive and slow. As an example, consider the steps associated with remote configuration of a RAID volume through an out-of-band management network interface and the addition of the RAID volume to a boot list. The RAID controllers are enumerated, the physical disks for creating the RAID volume are retrieved, the RAID volume is defined on selected of the physical disks, the RAID volume creation is staged to take place at a re-boot, then the volume creation is initiated followed by a re-boot of the server. When the server re-boots, the BIOS recognizes the new RAID volume as a boot source. The new RAID volume is added to the BIOS boot list and a modification to the BIOS is staged and then executed with a second re-boot of the server. Although creation of a RAID volume as described above provides an example of remote management steps for server management, each server subsystem involved in a management operation typically is configured separately, such as the BIOS, NIC, BMC, RAID, etc. . . . . Out of band configuration of these subsystems generally needs an administrator who understands management operations associated with each, including distinct commands to each subsystem for each configuration step. Missteps by an administrator can lead to difficulties that are often difficult to address through remote management network interfaces.

SUMMARY OF THE INVENTION

Therefore a need has arisen for a system and method which remotely configures a server information handling system to a desired end state definition.

In accordance with the present invention, a system and method are provided which substantially reduce the disadvantages and problems associated with previous methods and systems for configuration of server information handling systems by a remote management operation. A configuration end status definition communicates to a management processer of an information handling system for automatic application of configuration settings to the information handling system.

More specifically, a system administrator defines a desired end state for the configuration of an information handling system in a configuration end state definition XML file and communicates the configuration end state definition XML file to a BMC of a server information handling system. A configuration engine executing on the BMC analyzes the configuration end state definition XML file to determine changes made to the legacy configuration and an order for effecting the changes. For example, configuration changes are performed in a staged manner with re-boots of the information handling system as needed to have changes become effective. In one example embodiment, a RAID virtual disk is automatically created with configuration settings that take effect on a first re-boot and then added to a boot list with BIOS configuration settings that take effect on a second re-boot. In alternative embodiments, where configuration of a settings change requires as a condition precedent another settings change, the settings changes are staged in an appropriate order. The order is determined based upon an analysis by the configuration engine of the configuration end state definition, which can include an order as a field within the configuration end state definition. Re-configuration by a management processor is performed automatically based upon a single command, such as the importing of the configuration end state definition, so that an administrator need not interact with the management system until the configuration end state is accomplished on the information handling system.

The present invention provides a number of important technical advantages. One example of an important technical advantage is that a single command initiates a management operation at a server information handling system to bring the system to a desired end state definition. A management processor of the server information handling system automatically executes multiple steps to achieve the desired end state definition without multiple commands sent through a management network interface. Logic operating on the management processor parses the end state definition and executes steps for performing server information handling system configuration to achieve the end state definition. If an end user has a server information handling system configured in a desired manner, exporting the end state definition of the server to apply across multiple other systems provides a convenient tool for standardizing operations at multiple servers. In one embodiment, an administrator sets the time at which an end state definition will be applied so that performing the configuration will not interfere with data center operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts an example of an XML schema that defines an end state definition of an information handling system configuration.

DETAILED DESCRIPTION

Configuration of an information handling system is accomplished with one command by defining a configuration end state for the information handling system and bringing the information handling system to the configuration end state in response to the command. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
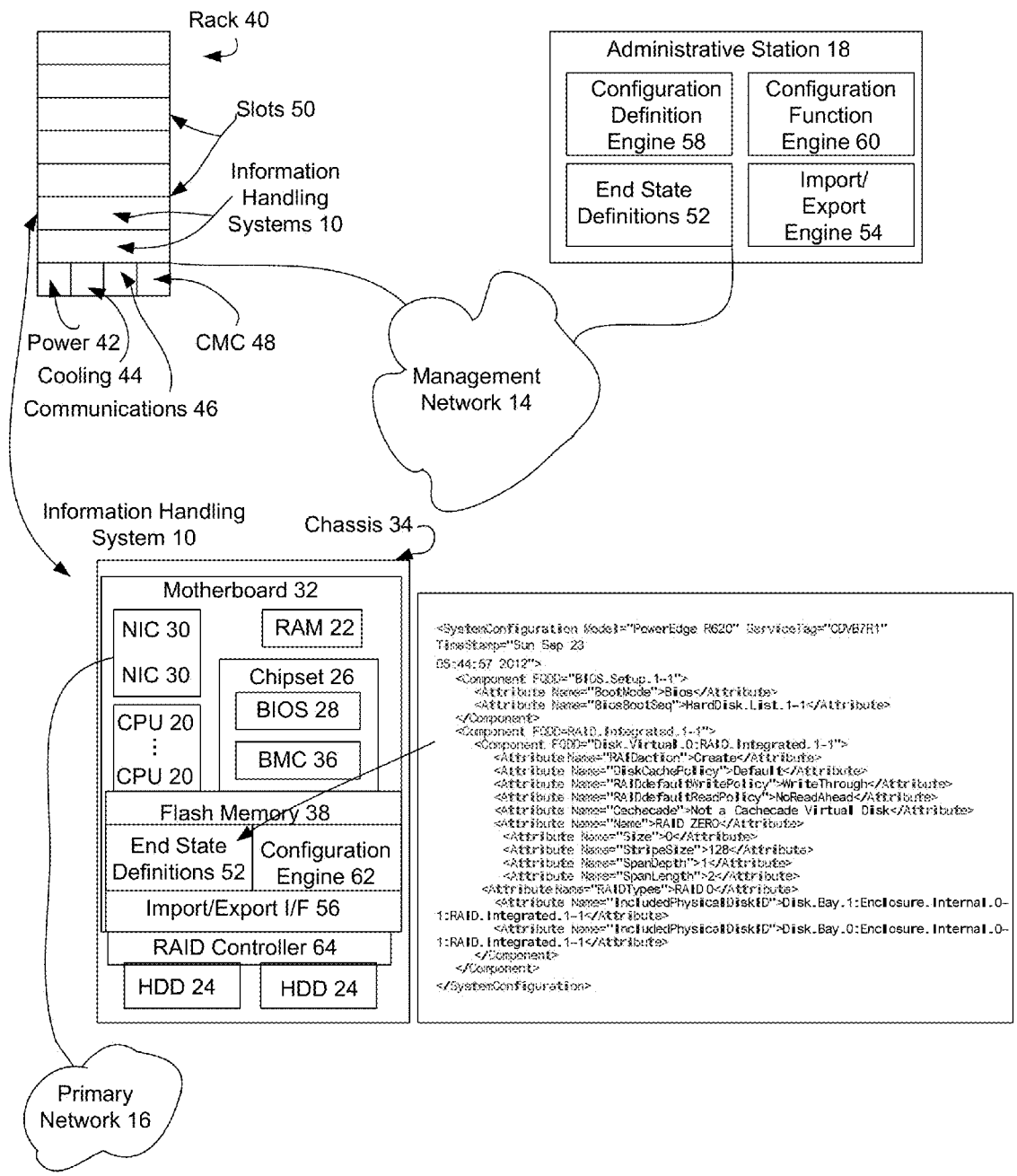
FIG. 1 depicts a block diagram of a server information handling system having automated configuration to a configuration end state communicated through a management network.

Referring now to FIG. 1, a block diagram depicts a server information handling system 10 having automated configuration to a configuration end state 12 communicated through a management network 14. Server information handling system 10 processes information to respond to client requests sent through a primary network 16, such as to support a website on the Internet or an enterprise intranet. Management network 14 provides an out-of-band network interface that allows information technology specialists to perform maintenance functions from remote location, such as an administration station 18.

Processing of information for primary network 16 is supported by one or more central processing units (CPUs) 20 that execute instructions stored in memory, such as random access memory 22 and hard disk drives 24 or other persistent storage. A chipset 26 includes processing components and firmware instructions, such as a BIOS 28, that coordinate cooperation of the processors and memory to communicate through one or more network devices, such as network interface cards (NICs) 30. A motherboard 32 interfaces CPU 20, RAM 22 and chipset 26, and provides structural support within a chassis 34 that contains motherboard 32.

Processing of information for management network 14 is supported by a management processor, such as a BMC 36 that executes management instructions stored in a flash memory 38. BMC 36 has interfaces with physical components of information handling system 10 to allow administrators to perform remote management functions with the physical components. For example, BMC 36 interfaces with chipset 26 and BIOS 28 to allow remote power up and power down of information handling system 10 in response to commands sent through management network 14. In some instances, management network 14 is established through an independent physical interface, such as a NIC assigned to BMC 36. In other instances, management network 14 is logically separate from primary network 16 to provide enhanced security that prevents unauthorized access to physical components.

Server information handling system 10 is deployed in a rack 40 that supports multiple information handling systems with shared infrastructure, such as a power subsystem 42, a cooling subsystem 44 and a communications subsystem 46, which are managed by a chassis management controller (CMC) 48. CMC 48 coordinates with BMCs 36 of server information handling systems 10 disposed in slots 50 to allocate power and cooling resource distribution throughout rack 40. CMC 48 is also accessible to administration station 18 through management network 18. Although the present embodiment describes a data center rack with plural server information handling systems, in alternative embodiments, alternative types of information handling systems may be used in alternative embodiments.

Administration station 18 provides information technology specialists with access to BMC 36 and CMC 48; however, out-of-band network communications are sometimes slow and can include less-intuitive user interfaces. Mistakes made during management network 14 communications are sometimes difficult to recover from, especially if BMC 36 becomes less responsive while executing inappropriate instructions. To improve remote management configuration updates, administrative station 18 generates an end state definition 52 and communicates the end state definition 52 to one or more information handling systems 10 with an import/export engine 54 in communication with an import/export interface 56 executed by management processor 36. A configuration definition engine 58 executing on administrative station 18 creates end state definitions 52 using administrator values input to a defined format, such as an XML schema. A configuration function engine 60 provides a platform on which an administrator can develop functions to complete proper installation of configuration parameters at an information handling system. Configuration functions are communicated from administrative station 18 to a configuration engine 62 so that each value in an end state definition XML file has a function available to perform configuration of an information handling system 10. In one embodiment, the end state definition XML file includes a field that defines functions to perform configuration of values and an order for performing the configuration.

In the example embodiment depicted by FIG. 1, a portion of end state definition 52 in an XML format is depicted that defines creation of a RAID volume as a bootable device that is added to the top of a boot list order of BIOS 28. Configuration in the example embodiment calls for two boots of information handling system 10 to have the configuration take effect. A first boot completes the RAID configuration and a second boot adds the RAID drive to the boot list. If the configuration steps are performed with commands sent through management network 14, an administrator must monitor the configuration, send commands to initiate re-boots, and send commands as information handling system 10 comes on line with each re-boot. Configuration engine 62 allows an administrator to issue an end state definition 52 as a one-time command to management processor 36 that results in achievement of the configuration end state values at components of information handling system 10 without further administrator interactions. In the example XML schema of FIG. 1, a fully qualified device description (FQDD) of a bootable device is defined for creation of the bootable device, which is then available to include in the boot list at a boot sequence or one-time boot attribute.

In the example XML schema end state definition 52, configuration engine 62 parses the XML field values to determine configuration functions to perform and the order in which to perform the configuration functions. The end state achieved by configuration engine 62 is creation of a virtual disk that does not exist locally on the RAID controller 64, labeled as RAID 0 Virtual Disk, and assignment of the created virtual disk to the BIOS 28 boot sequence., labeled under the component FQDD. Specifically, in the example schema, under the component with FQDD "Disk.Virtual.0;RAID.Integrated.1-1" the "RAIDaction" is set to create, and under the component with FQDD "BIOS.Setup.1-1" the "BootMode" attribute is set to "BIOS" and the "BiosBootSeq" attribute is set to "HardDisk.List.1-1". The functions performed by configuration engine 62 in response to end state definition 52 depends upon an analysis of the legacy end state definition present on information handing system 10 compared with the end state definition 52 provided as an update from administration station 10. For example, a comparison of a legacy and updated end state definitions 52 identifies attributes having new or changed values so that configuration engine 62 automatically calls functions to establish the new or changed values at information handling system 10. In the example embodiment, if the legacy end state definition 52 does not have a virtual drive, the RAID excerpt corresponding to "Disk.Virtual.0; RAID.Integrated.1-1" will not exist, and configuration engine 62 will first create a virtual drive based on values provided from a new end state definition 52, such as the "RAIDTypes" and "RAIDAction" attributes as well as other attributes as needed. Thus, configuration actions determined by a configuration engine 62 and the order of the configuration actions may depend upon the legacy configuration and may differ with different information handling systems 10, which can include different configuration functions as needed for system-specific components.

One advantage of the use of end state definitions 52 is that a single command can initiate a complex system configuration across multiple information handling systems. In one embodiment, transfer of an end state definition to an information handling system acts as the single command by including parameters that define the time for performing the configuration and the type of re-boots, such as forced re-boots that provide a more rapid re-configuration process when system data need not be saved or graceful re-boots that preserve system data. Once an information handling system is re-configured in a satisfactory manner, an administrator may export the end state definition 52 for re-use as imports to other information handling systems. As an example, if a rack 40 has new infrastructure installed, CMC 48 can coordinate configuration of each information handling system 10 in each slot 50 to interact with the new infrastructure by importing an end state definition for each configuration engine 62 to install. In one embodiment, a legacy component's configuration information is exported so that the same or modifications to the same configuration information may be used in a replacement component. Updates to multiple components may be performed with a single command, such as updates to RAID, BIOS, network devices, management firmware, virtual devices and other configuration settings. Once configuration is initiated, configuration engine 62 completes the configuration to achieve the end state definition without further commands sent through management network 14, even if multiple re-boots are needed to complete the configuration. In one embodiment, an administrator may inquire during the execution of the end state definition to get an identifier for the job that is queried for status, such as by attempting an import of the end state definition.

Figure 2:
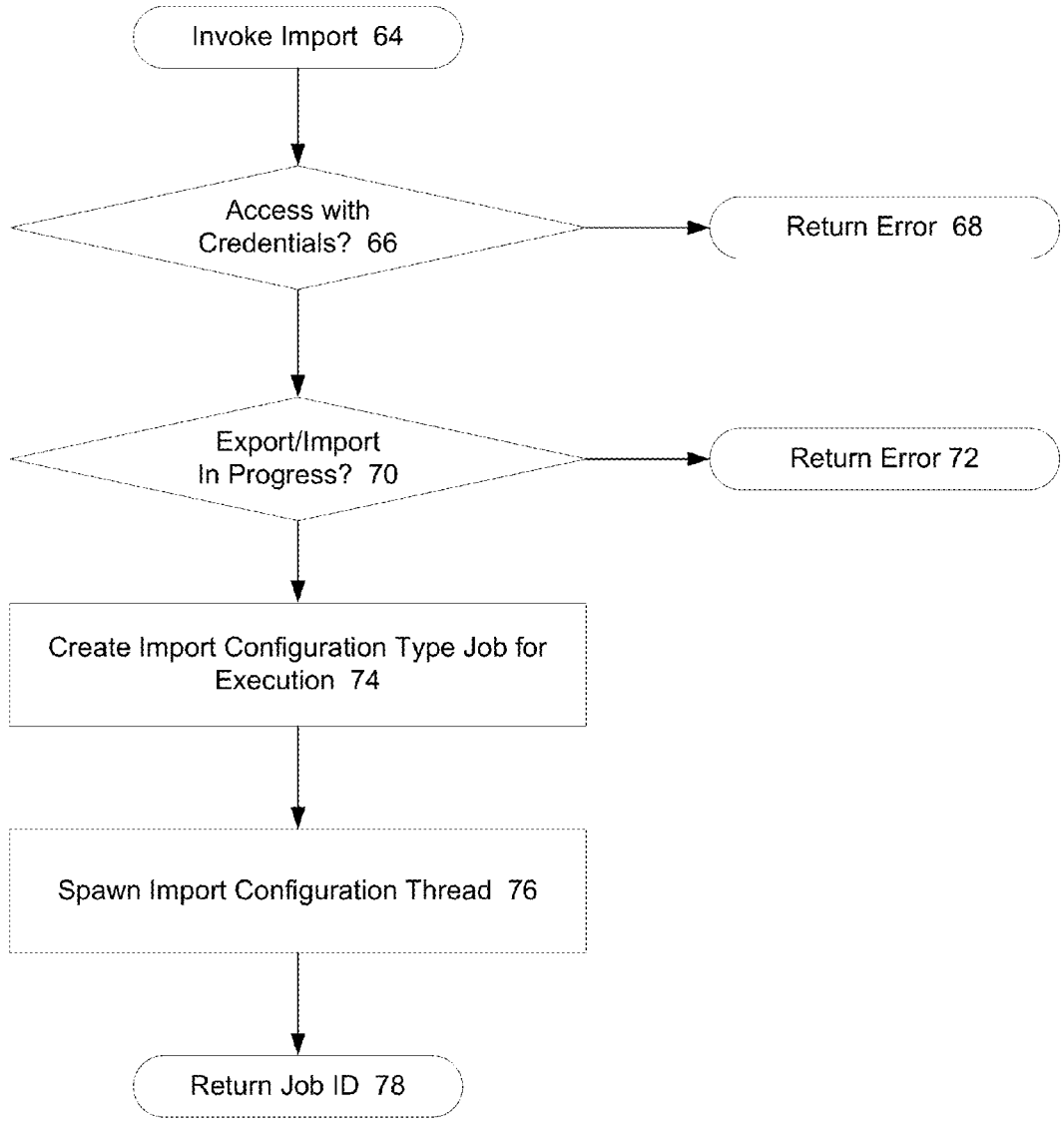
FIG. 2 depicts a flow diagram of a process for staging configuration at an information handling system from an end state definition.

Referring now to FIG. 2, a flow diagram depicts a process for staging configuration at an information handling system from an end state definition. At step 64, an administrator invokes an import method to import an end state definition to a target information handling system. In one embodiment, the invocation of the import method is the only command that the administrator issues in order to initiate configuration of the information handling system to have the configuration defined by the configuration end state definition completed by a management processor of the information handling system. At step 66, a determination is made of whether the management processor has credentials for retrieving the configuration end state definition. If not, the process continues to step 68 to return an error that the credentials are invalid for access to the configuration end state definition. If yes at step 66, the process continues to step 70 to export the configuration end state definition from the administration location for import to a target information handling system management processor. If a step 70 the import fails, the process continues to step 72 to issue an error for the export/import process. If at step 70 the export/import is a success, the process continues to step 74 for creating the import creation type job for execution with the management processor. At step 76, an import configuration thread is spawned at the management processor to perform the configuration of the information handling system so that the end state definition is achieved.

Figure 3:
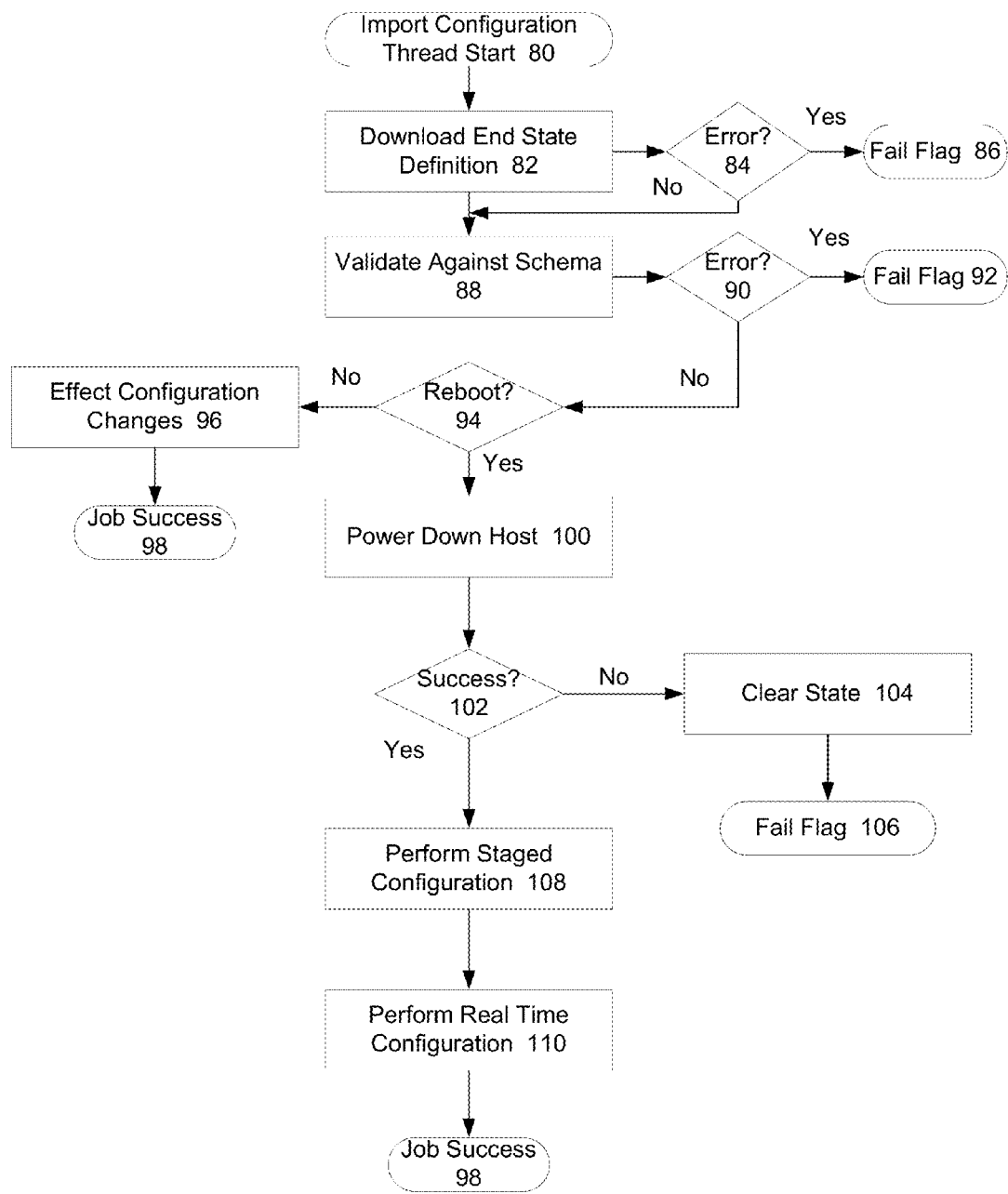
FIG. 3 depicts a flow diagram of a process for configuring an information handling system to have an end state definition.

Referring now to FIG. 3, a flow diagram depicts a process for configuring an information handling system to have an end state definition. The process begins at step 80 with initiation of the import configuration thread on the management processor. At step 82, the configuration end state definition is downloaded as an XML file. At step 84, a determination is made of whether errors occurred with the configuration end state definition download. If yes, at step 86 a job status flag is set to fail for notification to an administrator. If the configuration end state XML file downloads without errors at step 84, the process continues to step 88 to validate the configuration end state definition against the end state definition XML schema. A determination is made at step 90 if errors exist in the configuration end state definition relative to the schema and, if so, at step 92 a job status flag is set to fail for notification to an administrator. If the configuration end state definition validates against the schema, the process continues to step 94 to initiate configuration of the information handling system.

At step 94, a determination is made of whether the updated configuration settings require a system re-boot. If not, the process continues to step 96 to effect the configuration changes, such as by writing the new values from the configuration end state definition to the appropriate components, and ends at step 98 with an update of the job status and log results with a successful configuration. If at step 94 a determination is made that a re-boot is needed, the process continues to step 100 to effect configuration changes associated with a boot and initiate power down of the information handling system for the re-boot. At step 102, a determination is made of whether the power down was a success and, if not, the process continues to step 104 to clear the installation state and step 106 to set a job status flag to fail for notification to an administrator. If power down of the information handling system is a success at step 102, the process continues to step 108 to perform a staged configuration of configuration settings. At step 108, staged configuration is performed with a reboot required to apply the configuration. Multiple re-boots of the information handling system may be performed with different configuration settings at each re-boot. The order for staging the writing of configuration settings and the re-boots is automatically determined by the management processor. In one embodiment, the management processor prioritizes writes of configuration settings and re-boots based upon internal logic that analyzes the types of configuration updates being performed. In such an embodiment, in light of the time saved by avoiding management network communications, extra re-boots may be added to ensure proper configuration even where a re-boot may not necessarily be required. Alternatively, the configuration end status definition includes fields that define an order for writing configuration settings and the timing and order of re-boots. Once staged configuration is complete at step 108, the process continues to step 110 to perform real time configuration that completes the configuration process and to step 112 to update the job status and log results as a successful job.

Referring now to FIG. 4, an example of an XML schema is depicted that defines an end state definition of an information handling system configuration. In alternative embodiments, alternative XML fields may be used and schemas may be used for specific information handling system platforms.

Although the present invention has been described in detail, it should be understood that various changes, substitutions and alterations can be made hereto without departing from the spirit and scope of the invention as defined by the appended claims.

What is claimed is:

1. A method for configuring server information handling system subsystems, the method comprising:
   defining a configuration end state for the plural subsystems at an administration system interfaced with a management network;
   communicating the configuration end state through the management network to a management processor of the server information handling system;
   analyzing the configuration end state with the management processor to determine locally at the server information handling system plural configuration actions and an order to perform the configuration actions, at least one of the plural configuration actions having a reboot that takes place before another of the plural configuration actions can succeed; and
   automatically performing by the management processor without additional instructions sent through the management network the configuration actions in the order to configure the plural subsystems to have the configuration end state, including reboot before the another of the plural configuration actions;
   wherein defining a configuration end state further comprises:
   performing subsystem configuration at a server information handling system;
   tracking the subsystem configuration in an end state file with a management processor of the server information handling system; and exporting the end state file.

2. The method of claim 1 wherein the configuration end state is an XML file having a schema defining configurations for at least BIOS, RAID, NIC, and management firmware subsystems.

3. The method of claim 1 wherein analyzing the configuration end state with the management processor to determine plural configuration actions and an order to perform the configuration actions further comprises:
   comparing a legacy configuration end state and the configuration end state to determine configuration changes;
   determining an order for effecting the configuration changes;
   staging the configuration actions to effect the configuration changes in the order.

4. The method of claim 1 wherein automatically performing the configuration actions further comprises:
   storing plural configuration actions in flash memory interfaced with the management processor, the configuration actions including at least plural re-boots; and
   initiating the configuration actions in response to a command communicated through the management network; and
   completing the configuration actions including the plural re-boots without additional commands provided through the management network.

5. The method of claim 4 wherein the command comprises communication of the configuration end state.

6. The method of claim 4 wherein the plural re-boots comprise at least a first re-boot to create a RAID volume as a bootable device and a second re-boot to arrange the created RAID volume in a BIOS boot list.

7. The method of claim 1 wherein the management controller comprises a chassis management controller operable to manage plural information handling systems disposed in a common rack, the chassis management controller forwarding the configuration end state to plural server information handling system baseboard management controllers disposed in the rack for configuration of plural server information handling systems to the configuration end state.

8. A server information handling system comprising:
a chassis;
a processor disposed in the chassis, the processor operable to process information;
memory disposed in the chassis and interfaced with the processor to store the information;
one or more network devices interfaced with the processor, at least one network device operable to communicate the information with a primary network and at least one network device operable to communicate the information with a management network;
a management processor operable to manage operations of the processor including at least boot and re-boot operations;
a configuration engine stored in the memory and accessible for execution on the management processor, the configuration engine operable to read a configuration end state stored in the memory, to determine locally at the management processor plural configuration actions associated with establishing a configuration of the configuration end state and an order to perform the plural configuration actions, and to automatically perform the configuration actions to achieve the configuration end state without communication of commands through the management network to the management processor after the configuration actions begin, configuration actions including at least one reboot of the processor before at least one other configuration action is performed, the configuration engine determining the plural configuration actions by comparing a legacy configuration end state and the configuration end state to determine configuration changes, determining an order for effecting the configuration changes and staging the configuration actions to effect the changes in the order.

9. The server information handling system of claim 8 wherein the configuration engine automatically performs the configuration actions in response to receipt of the configuration end state through the management network.

10. The server information handling system of claim 8 wherein:
the configuration end state comprises an XML file; and
the configuration actions comprise plural re-boots of the server information handling system.

11. The server information handling system of claim 10 wherein the configuration actions further comprise a first reboot to create and establish a RAID drive as a bootable device and a second reboot to arrange the RAID drive as a first bootable device in a BIOS boot list.

12. The server information handling system of claim 8 further comprising:
a rack supporting the chassis; and
a chassis management controller associated with the rack and interfaced with the management controller through the management network;
wherein the chassis management controller is operable to coordinate communication of the configuration end state to plural server information handling systems supported in the rack so that the plural server information handling systems have a common configuration end state.

13. The server information handling system of claim 8 wherein the configuration end state includes a time at which the configuration engine initiates the configuration actions.

14. The server information handling system of claim 8 wherein the configuration engine performs the configuration actions in response to a single command.

15. A method for configuration of a server information handling system, the method comprising:
communicating a configuration end state XML file from an external location through a management network to a management processor of the server information handling system;
analyzing locally at the server information handling system the configuration end state XML file to identify plural configuration actions at plural subsystems of the information handling system and an order for performing the configuration actions, the plural configuration actions including at least one reboot required to perform a subsequent configuration action, the analyzing including comparing a legacy configuration end state and the configuration end state to determine configuration changes, the order for performing the configuration actions and staging the configuration actions to effect the changes in the order; and
executing the configuration actions in the order to configure the server information handling system to the configuration end state without sending any commands through the management network after the initiation of the configuration actions until the configuration end state is achieved.

16. The method of claim 15 wherein the configuration actions comprise plural re-boots of the server information handling system initiated by the management processor.

17. The method of claim 16 wherein the plural subsystems comprises a storage subsystem having a configuration action or establishing a RAID device and a BIOS subsystem having a configuration action of making the RAID device a bootable device.

18. The method of claim 15 wherein analyzing the configuration end state XML file further comprises:
comparing the configuration end state XML file with a legacy configuration end state XML file stored in the memory to determine configuration changes; and
arranging configuration actions to effect the configuration changes.

19. The method of claim 18 wherein the configuration changes comprise export of legacy configuration information for a removed hardware device and import of replacement configuration information for a replacement hardware device.

20. A method for configuring server information handling system subsystems, the method comprising:
defining a configuration end state for the plural subsystems at an administration system interfaced with a management network;
communicating the configuration end state through the management network to a management processor of the server information handling system;
analyzing the configuration end state with the management processor to determine locally at the server information handling system plural configuration actions and an order to perform the configuration actions, at least one of the plural configuration actions having a reboot that takes place before another of the plural configuration actions can succeed; and
automatically performing by the management processor without additional instructions sent through the management network the configuration actions in the order to configure the plural subsystems to have the configuration end state, including reboot before the another of the plural configuration actions;

wherein analyzing the configuration end state with the management processor to determine plural configuration actions and an order to perform the configuration actions further comprises:

comparing a legacy configuration end state and the configuration end state to determine configuration changes;

determining an order for effecting the configuration changes;

staging the configuration actions to effect the configuration changes in the order.

21. The method of claim 20 wherein the configuration end state is an XML file having a schema defining configurations for at least BIOS, RAID, NIC, and management firmware subsystems.

22. The method of claim 20 wherein defining a configuration end state further comprises:

performing subsystem configuration at a server information handling system;

tracking the subsystem configuration in an end state file with a management processor of the server information handling system; and exporting the end state file.

23. The method of claim 20 wherein automatically performing the configuration actions further comprises:

storing plural configuration actions in flash memory interfaced with the management processor, the configuration actions including at least plural re-boots; and initiating the configuration actions in response to a command communicated through the management network; and completing the configuration actions including the plural re-boots without additional commands provided through the management network.

24. The method of claim 23 wherein the command comprises communication of the configuration end state.

25. The method of claim 23 wherein the plural re-boots comprise at least a first re-boot to create a RAID volume as a bootable device and a second re-boot to arrange the created RAID volume in a BIOS boot list.

26. The method of claim 20 wherein the management controller comprises a chassis management controller operable to manage plural information handling systems disposed in a common rack, the chassis management controller forwarding the configuration end state to plural server information handling system baseboard management controllers disposed in the rack for configuration of plural server information handling systems to the configuration end state.

* * * * *